United States Patent [19]
Townsend et al.

[11] Patent Number: 5,810,198
[45] Date of Patent: Sep. 22, 1998

[54] MOTORIZED TABLET DISPENSER

[76] Inventors: James M. Townsend, 600 W. Hubbard, Gozug D'Alena, Id. 83814; Jeffrey L. Bendio, 14712 E. Olympic Ave., Spokane, Wash. 99216

[21] Appl. No.: 708,565

[22] Filed: Sep. 5, 1996

[51] Int. Cl.[6] .................................................. G07F 11/00
[52] U.S. Cl. ........................................... 221/7; 221/266
[58] Field of Search .................................. 221/7, 8, 15, 2, 221/3, 9, 264, 266, 277

[56] References Cited

U.S. PATENT DOCUMENTS

| | | | |
|---|---|---|---|
| 425,996 | 4/1890 | Dieterich | 221/264 |
| 998,389 | 7/1911 | Penick et al. | 222/361 |
| 1,066,753 | 7/1913 | Rast | 221/264 |
| 2,774,470 | 12/1956 | Q'Part | 221/8 |
| 3,323,688 | 6/1967 | Silver | 221/264 |
| 3,332,575 | 7/1967 | Pilot | 221/8 |
| 3,344,951 | 10/1967 | Gervais | 221/7 |
| 3,410,450 | 11/1968 | Fortenberry | 221/7 |
| 3,687,336 | 8/1972 | Gayle | 221/7 |
| 3,871,551 | 3/1975 | Bender | 221/8 |
| 4,557,404 | 12/1985 | Solomon | 222/325 |
| 4,638,923 | 1/1987 | Miner | 221/132 |
| 4,763,810 | 8/1988 | Christiansen | 221/3 |
| 5,104,003 | 4/1992 | Stecoza | 222/83.5 |
| 5,152,422 | 10/1992 | Springer | 221/2 |

*Primary Examiner*—Kenneth Noland
*Attorney, Agent, or Firm*—David S. Thompson

[57] ABSTRACT

A motorized tablet dispenser provides a tablet hopper mechanism suitable for storage of an entire prescription of tablets. A disk-like loading plate is carried at the base of the tablet hopper, and provides radially arrayed tablet voids and a spur gear perimeter. The loading plate is rotated by means of a high torque, low speed, geared motor. Each major type, size and shape of tablet is associated with a loading plate having voids sized to fit that tablet, and any loading plate may be installed in a dispenser. An easily operated push-button mechanism translates linear motion along a vertical axis into angular motion about a horizontal axis of a tablet transfer mechanism. A single tablet is moved from the loading plate into a recess in the tablet transfer mechanism. The interface between the cylindrical surface on the tablet transfer mechanism and the planar loading plate prevents jamming. Rotation of the tablet transfer mechanism causes the tablet to be dropped onto a slide where it falls into a receptacle accessible to a user. Movement of the tablet transfer mechanism also contacts an electrical switch, causing the motor to rotate the loading plate which has a stirring post which moves the tablets, causing the voids in the loading plate to be filled. A sensor monitors the quantity of tablets in the tablet hopper. This information is processed, possibly resulting in a signal to indicate the need to refill the dispenser.

12 Claims, 15 Drawing Sheets

MOTORIZED TABLET DISPENSER

CROSS-REFERENCES

There are no applications related to this application filed in this or any foreign country.

BACKGROUND

Patients who fail to properly take their medication number in the millions. In failing to properly take their medication, such patients are creating major problems for themselves and for the health care system. According to the Center for Pharmaceutical Economics, over 125,000 Americans die each year in part because of prescription noncompliance. As many as half of the 1.6 billion prescriptions dispensed each year may be taken incorrectly. The cost, in terms of hospital and nursing home admissions, physician office visits and lost earnings, runs into the billions of dollars each year. Some economists place the cost of prescription noncompliance at a level similar to illnesses such as diabetes, obesity, and cardiovascular disease. As a result, it is widely held that improving compliance with prescription medications is an important strategy to contain health care costs.

In recent years, "child-proof" tablet bottles have become a standard method of dispensing prescription drugs because the difficulty in opening the bottle prevents children from taking potentially harmful medicine. Unfortunately, other large groups of people are also prevented from opening the bottle. These groups would include many of the aged and handicapped, people recovering from accidents, surgery or serious disease, people who have tremors, impaired memory, serious cardiovascular disease, strokes, arthritis and other ailments. Typically, the people who need medication most are those least likely to be able to open the bottle. As a result, many such individuals have relatives transfer the prescription to more easily opened containers. These containers are often not marked, and therefore do not contain dosage instructions; when emptied, there is an issue of what drug is needed to refill. Even after transfer, many of the aged and infirm, particularly those with severe arthritis, have difficulty in opening even a standard threaded-top bottle. Thus, physical barriers present with every prescription may prevent many people from satisfying the requirements of their prescriptions.

Failure to timely renew prescriptions is also a major problem. Frequently a physician receives a call from a patient who has just run out of medication. The physician is faced with the choice of renewing the prescription without seeing the patient, or alternatively, allowing the patient to do without the medication until an appointment may be arranged. Neither alternative is consistent with good medical practice. Ideally, some device would adequately alert the patient that the prescription was nearly exhausted, and knowing the condition still remained, the patient would call in advance for a refill.

Failure to be adequately and repeatedly reminded to take medication is a major reason for failure to successfully follow the prescription. In an institutional setting, a large part of the job performed by health care workers is related to medication distribution and administration. In the private setting, this effort is often needed, but not available. Many people, either due to disability and infirmity or due to a hectic lifestyle or lack of concern, simply cannot remember to take their medication. Some form of outside help to remind patients that it is time to take the medication is clearly indicated.

The cumulative result of failure to take individual tablets on time may result in a failure to finish the prescription. Over time, failure to finish tends to dull the effectiveness of the medication to that patient in particular and other patients in general. Antibiotic prescriptions must be fully taken or traces of bacterial infection may remain, due to the failure to complete the treatment regimen. The remaining bacteria will be those most resistant to the medication. In time, these bacteria will tend to predominate, and may further mutate into a resistant strain, causing the medication to become less effective. Thus, failure to follow the treatment regimen may result in a decrease in the effectiveness of the medication to all patients.

Moreover, failure to remember to take medication is also a major cost to pharmaceutical firms in terms of lost sales. Where each tablet may cost a dollar or more, and where intake may not be doubled to compensate for tablets not timely taken, every tablet not taken results in lost revenue.

For the foregoing reasons, there is a need for tablet dispenser having means for dispensing tablets by activation of a pushbutton actuator. The tablet dispenser must have a jam-proof tablet dispensing mechanism. The tablet dispenser must remind the user to take tablets in a timely manner. The tablet dispenser must remind the user when the supply of tablets is low, so that a prescription may be timely refilled. The tablet dispenser must provide an enclosure having a surface area of sufficient area to adequately label the medicine contained, even if large type is used. The tablet dispenser must be electronically programmable, either by the user or the manufacturer, to indicate that it is time to take a tablet, to prevent the user from taking a tablet until it is time, or for other functionality.

SUMMARY

The present invention is directed to an apparatus that satisfies the above needs. A novel motorized tablet dispenser is provided that combines the ease of push-button operation with a jam-proof motorized delivery mechanism that is easily customized for differently sized tablets.

A preferred version of the motorized tablet dispenser of the present invention includes:

(a) A housing provides an external receptacle into which a tablet is released in response to operation of a pushbutton. In the preferred embodiment of the invention, the housing provides supporting means for a pushbutton mechanism, a tablet transfer mechanism, a tablet hopper mechanism, an electric motor and other components. A tablet slide is integrated into the base of the housing, and delivers a tablet to the receptacle, which is typically carried by the outside of the front panel of the housing.

(b) A pushbutton mechanism allows one-handed operation by a patient, and requires an absolute minimum of manual dexterity. The pushbutton mechanism travels vertically, having an upper pushbutton element protruding from a hole in the top of the housing and having a lower plunger traveling against the bias of a spring carried by a spring support tube carried by the bottom of the housing. Downward motion, resulting from the patient pushing the button, causes the plunger, traveling in the spring support tube, to compress the spring. Releasing the button allows the spring to restore the mechanism to its upward, resting, position. The linear motion by the pushbutton mechanism in the vertical direction provides the operative motion to a tablet transfer mechanism, which in turn activates an electrical switch. A horizontal drive slot in the body of the pushbutton mechanism engages the drive rod carried by the tablet transfer mechanism, causing rotary motion of the tablet transfer mechanism about its axis.

(c) A tablet hopper provides a tablet storage area having generally cylindrical sides. The hopper is filled by means of a fill port in the top of the housing having a threaded lid. A circular bottom surface at a slight angle to the horizontal supports a loading plate having voids sized to fit tablets containing a major prescription drug. The loading plate is interchangeable with loading plates having voids compatible with tablet sizes associated with every major drug marketed.

(d) A high-torque, low speed electric motor having an output gear engages the spur gear perimeter of the loading plate, turning the loading plate within the tablet hopper. A stirring post, carried by the loading plate, stirs the tablets in the hopper, thereby causing tablets to fill the voids in the loading plate as it rotates.

(e) A tablet transfer mechanism receives a single tablet from the loading plate carried by the tablet hopper, and transfers it to a slide which in turn delivers the tablet to the receptacle accessible from the outside of the housing. Co-linear front and rear axles, supported by the housing, allow the body of the tablet transfer mechanism to rotate approximately 90 degrees. A drive rod, parallel to the axles, engages the drive slot in the body of the pushbutton mechanism, thereby causing the tablet transfer mechanism to rotate in response to the linear motion of the pushbutton. A cylindrical surface on one side of the body provides a recess sized to hold a single tablet. When this recess is lined up with a tablet carried by a void in the loading plate, the tablet transfers downwardly, through a hole in the base of the hopper, and into the recess in the tablet transfer mechanism.

(f) An electrical switch, carried by the housing, controls the operation of the motor driving the loading plate. The electrical switch is activated by contact with the body of the tablet transfer mechanism. The motor causes the loading plate to rotate, thereby stirring the tablets contained in the hopper and re-filling any empty tablet voids in the loading plate.

The motorized tablet dispenser may also include:

(A) A microcontroller device may be used to perform any of several functions. In particular, the microcontroller may be used to regulate the period of operation of the electric motor driving the loading plate. Additionally, the microcontroller device may coordinate the operation of a sensor monitoring the quantity of tablets in the tablet hopper and the associated LED or other annunciator. Furthermore, the microcontroller may be used to activate an LED or similar annunciator to indicate that the patient should take a tablet. In some versions of the invention, the microcontroller may drive a liquid crystal display (LCD).

(B) An LCD display may be provided, typically located at the top of the housing. The LCD may provide such functionality as time of day, day of week and alarm functions, indicating that the patient should take a tablet. Acoustic alarms may be provided to alert the patient that it is time to take a tablet. The alarm will programmable, in a known manner, either by the user or by the manufacturer, to alert the patient when a tablet is to be taken.

It is therefore a primary advantage of the present invention to provide a novel motorized tablet dispenser that is reliable, suited to almost any tablet type, having a jam-proof design and low cost of manufacture.

Another advantage of the present invention is to provide a novel motorized tablet dispenser with the advantage of pushbutton activation means suited for use by patients who are unable to turn a knob. Alternatively, the invention is also adaptable to activation by means of a knob, if that is desired.

Another advantage of the present invention is to provide a novel motorized tablet dispenser having an electronic sensing means for determining when the tablet hopper is nearly empty, and LED warning means for alerting the patient of this event.

Another advantage of the present invention is to provide a novel motorized tablet dispenser that is suitable for use with a plurality of loading plates, each loading plate custom designed for use with a specific tablet size, shape and type.

Another advantage of the present invention is to provide a novel motorized tablet dispenser that will run for months on a single 9V battery, or indefinitely if plugged into 110 volts ac current.

Another advantage of the present invention is to provide a novel motorized tablet dispenser having an annunciator to indicate to the patient that it is time to take tablet.

DRAWINGS

These and other features, aspects, and advantages of the present invention will become better understood with regard to the following description, appended claims, and accompanying drawings where:

DESCRIPTION

Figure 10:
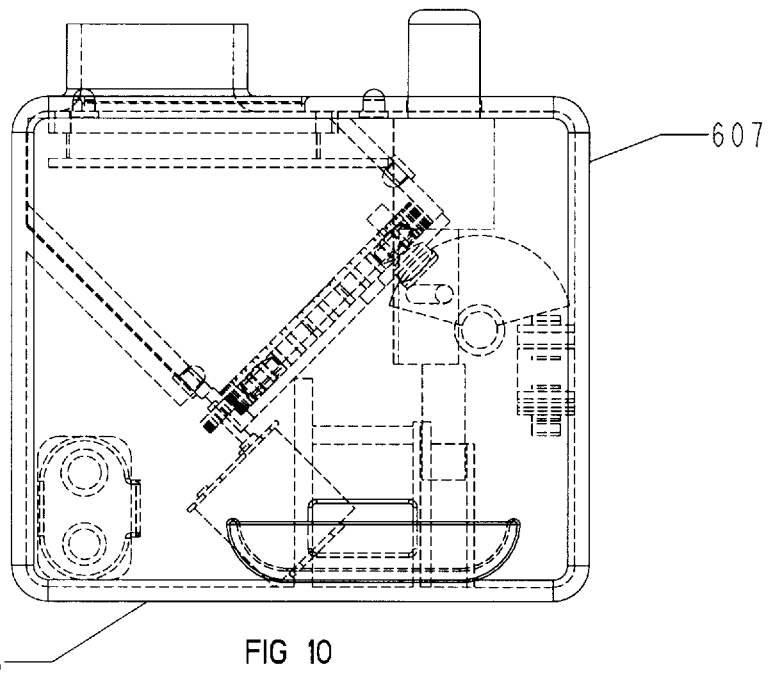
FIG. 10 is an isometric view of a version of the motorized tablet dispenser of the invention showing all the assemblies and their interaction.
Figure 10A:
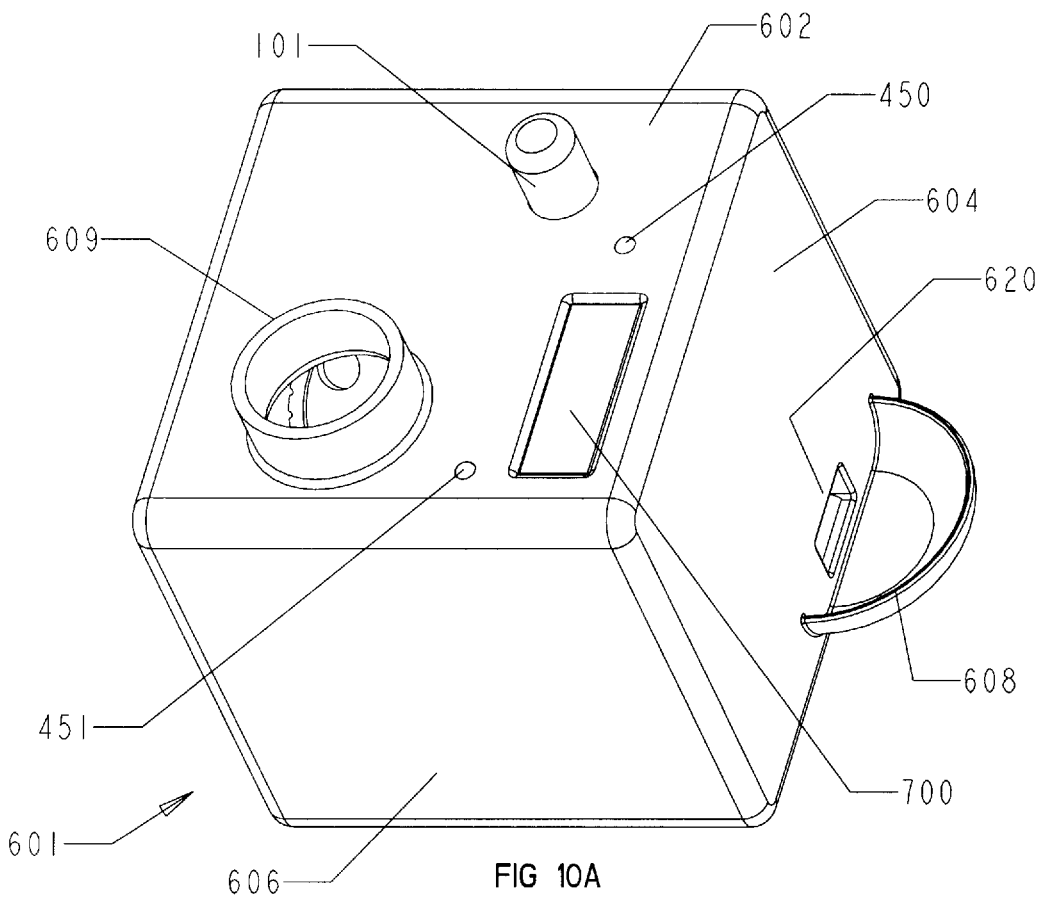
FIG. 10A is a perspective view of the outside housing, having the cap removed, revealing a loading plate carried by the tablet hopper.
Figure 11:
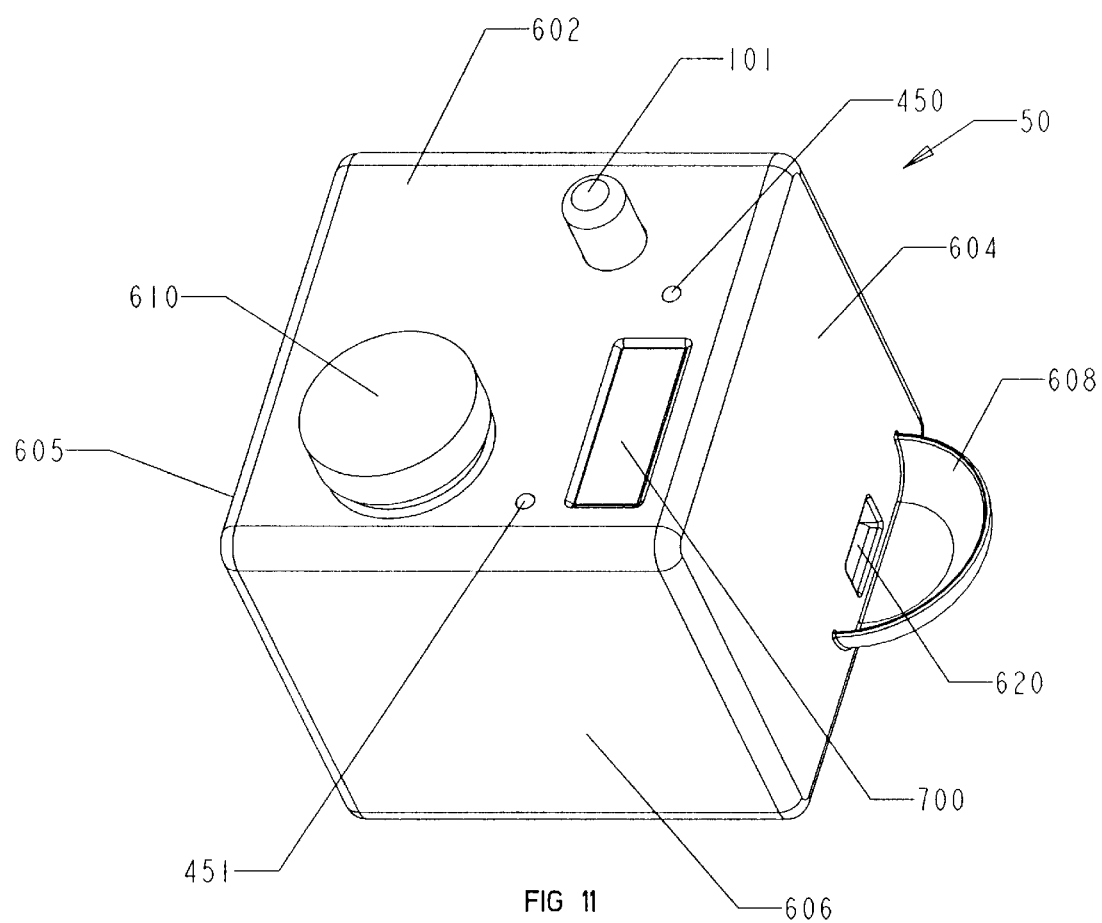
FIG. 11 is a perspective view of the motorized tablet dispenser.
Figure 12A:
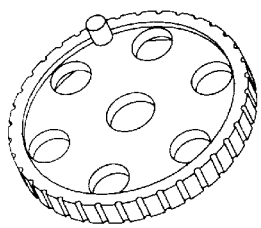
FIGS. 12A through 12P are isometric views 16 versions of the loading plates carried by the tablet hopper, with differently sized openings that are associated with differently sized tablets to be dispensed.
Figure 12B:
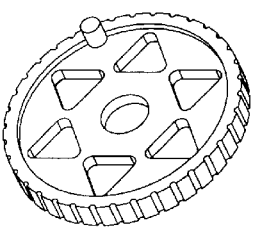
Figure 12C:
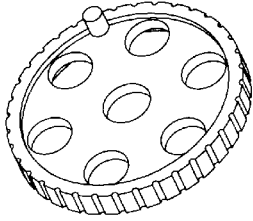
Figure 12D:
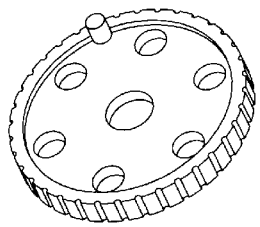
Figure 12E:
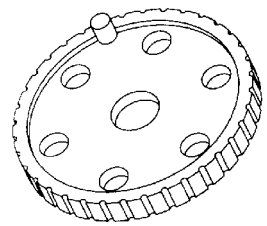
Figure 12F:
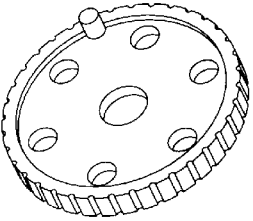
Figure 12G:
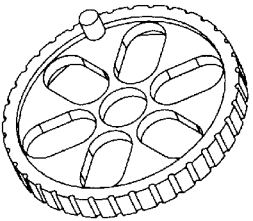
Figure 12H:
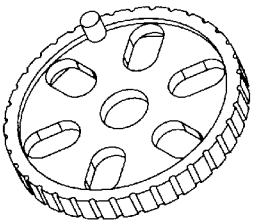
Figure 12I:
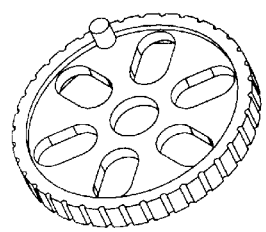
Figure 12J:
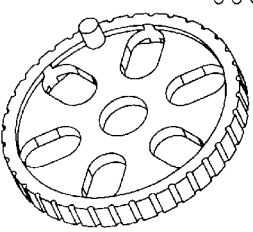
Figure 12K:
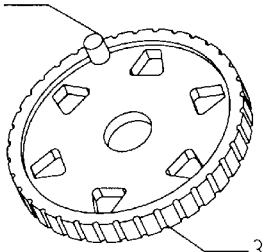
Figure 12L:
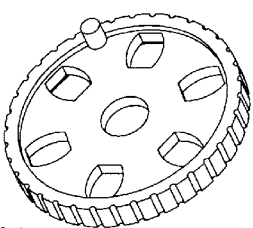
Figure 12M:
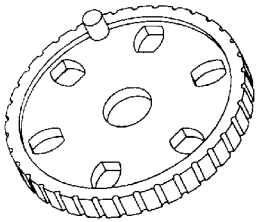
Figure 12N:
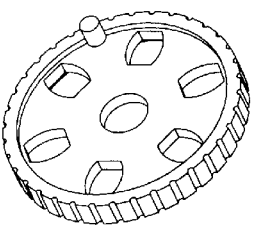
Figure 12O:
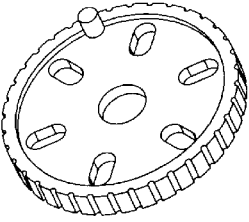
Figure 12P:
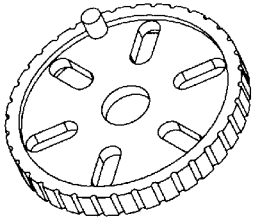

Referring in particular to FIGS. 10 and 10A, a version of the motorized tablet dispenser constructed in accordance with the principles of the invention is seen. The motorized tablet dispenser 50 provides a tablet hopper 300 suitable for storage of an entire prescription in tablet form. A disk-like loading plate 325 is carried adjacent to the tablet hopper, and provides radially arrayed tablet voids and a spur gear perimeter. All major tablet sizes and shapes are associated with a loading plate having voids sized to fit that tablet, and any loading plate may be installed in the tablet dispenser. An easily operated pushbutton mechanism 100 translates linear motion along a vertical axis into angular motion about a horizontal axis by a tablet transfer mechanism 150. A single tablet is moved from the loading plate into a tablet recess 152 in the tablet transfer mechanism. Rotation of the tablet transfer mechanism causes the tablet to be dropped onto a slide 400 where it falls into a receptacle 608 on the outside of the housing 600, where it is assessable to a user. Movement of the tablet transfer mechanism also releases an electrical switch 200, causing an electrical motor 350 to rotate the loading plate which has a stirring post 330 which moves the tablets, causing the voids to be filled. A two-element sensor device 500, having a IR-emitting LED D4 and a phototransistor Q2, monitors the tablet hopper 300, sensing the level of tablets remaining. A signal is generated in response, possibly resulting in an indicator warning of the need to refill the dispenser.

The housing 600 provides a body 601 having a top 602, bottom 603, front 604, back 605 and left and right sides 606, 607. A receptacle 608, which catches the tablets as they are dispensed, is mounted next to an opening 620 on the front 604 of the housing 600. An externally threaded fill port 609 having an internally threaded cap 610 is located on the top of the housing and allows the barrel 301 of the tablet hopper 300 to be filled (or emptied). A pushbutton hole 611 is located on the top of the body of the housing, and allows a pushbutton 101 to protrude vertically. LED holes 612, 613 allow LED indicators to be installed. An optional rectangular LCD opening 614 allows an LCD display to be installed.

Figure 1:
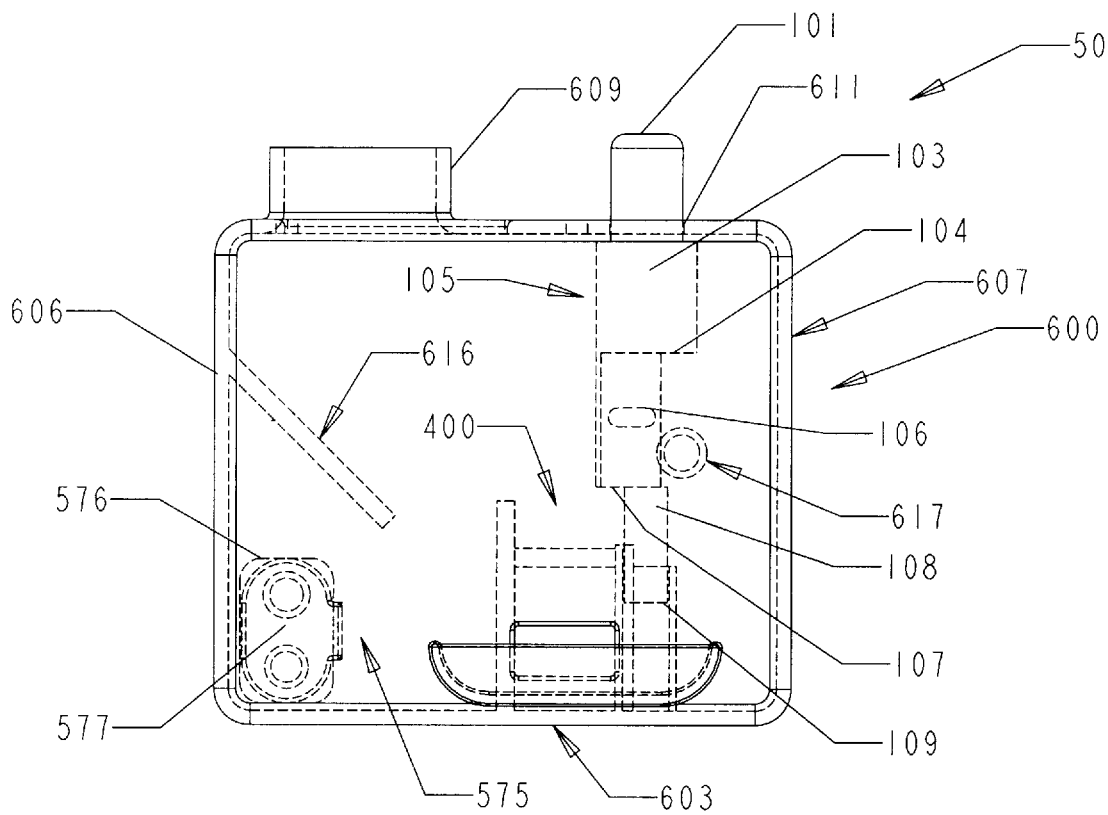
FIG. 1 is an isometric view of a version of the motorized tablet dispenser of the invention showing the pushbutton mechanism, with most other assemblies removed for clarity.
Figure 1A:
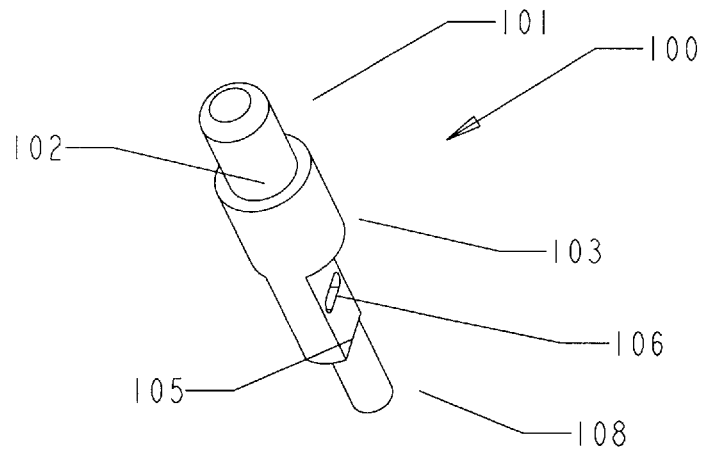
FIG. 1A is a perspective view of the pushbutton mechanism, removed from the tablet dispenser housing to more clearly show its features.

As seen in FIG. 1, a spring support tube 615 is mounted within the enclosure on the bottom surface 603. The spring support tube is a vertically oriented cylindrical tube having an inside diameter slightly greater than the outside diameter of the plunger 108 of the pushbutton mechanism. A coil spring 619 is carried by the spring support tube, and biases the pushbutton mechanism upwardly.

Figure 2:
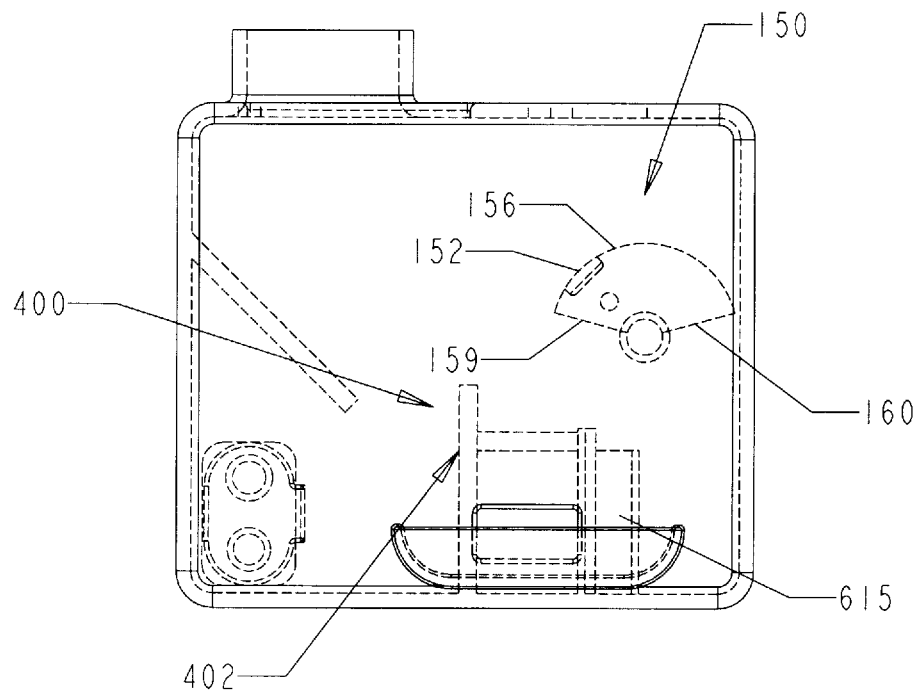
FIG. 2 is an isometric view of a version of the motorized tablet dispenser of the invention showing the tablet transfer mechanism, with most other assemblies removed for clarity.
Figure 9:
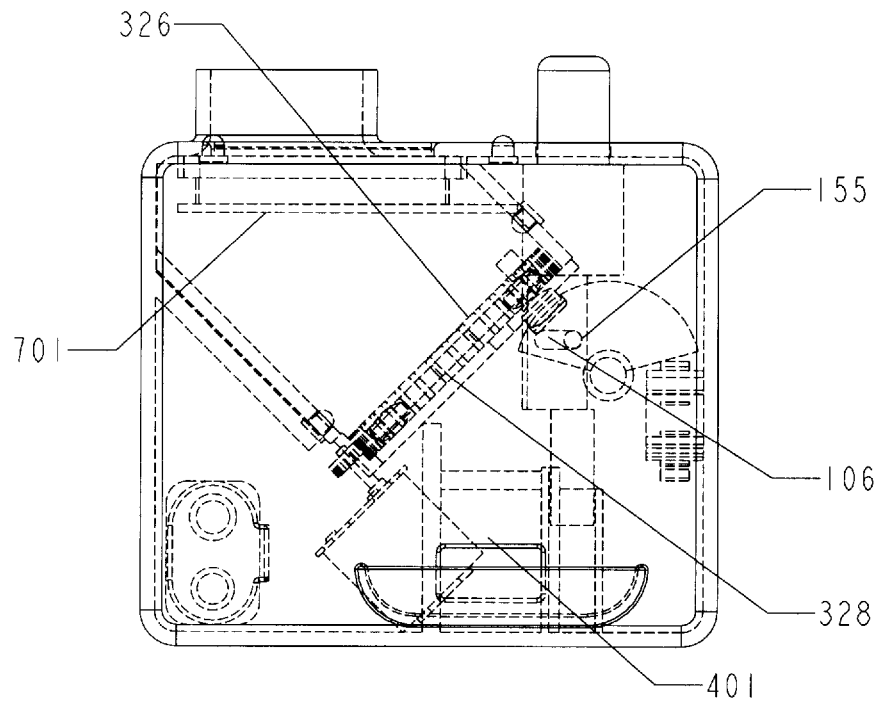
FIG. 9 is an isometric view of a version of the motorized tablet dispenser of the invention showing the pushbutton mechanism, tablet hopper, motor, tablet transfer, tablet sensor, LCD, LED, and battery assemblies, with most other assemblies removed for clarity.
Figure 9A:
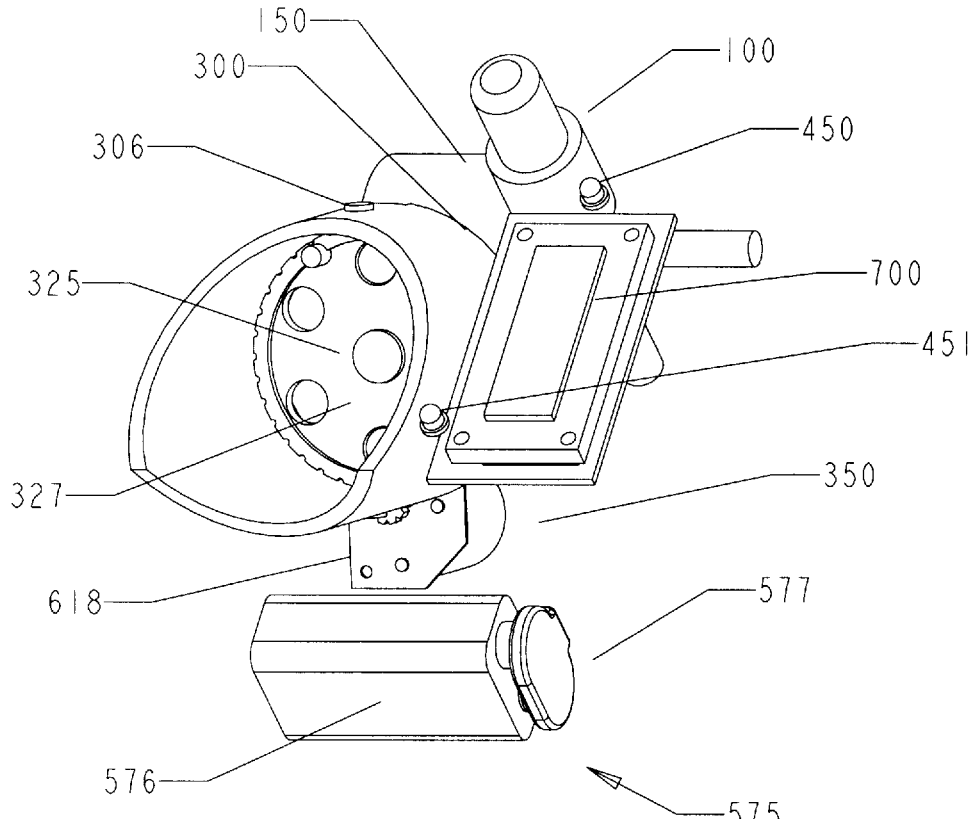
FIG. 9A is a perspective view of the pushbutton mechanism, tablet hopper, motor, tablet transfer, tablet sensor, LCD, LED, and battery assemblies, removed from the tablet dispenser housing to more clearly show their interaction and spatial relationship.

As seen in FIGS. 2 and 9, a hopper support surface 616 is a portion of the housing 600 that supports the tablet hopper 300. The support surface is typically a partial cylinder that has approximately the same diameter as the barrel 301 of the hopper.

Figure 7:
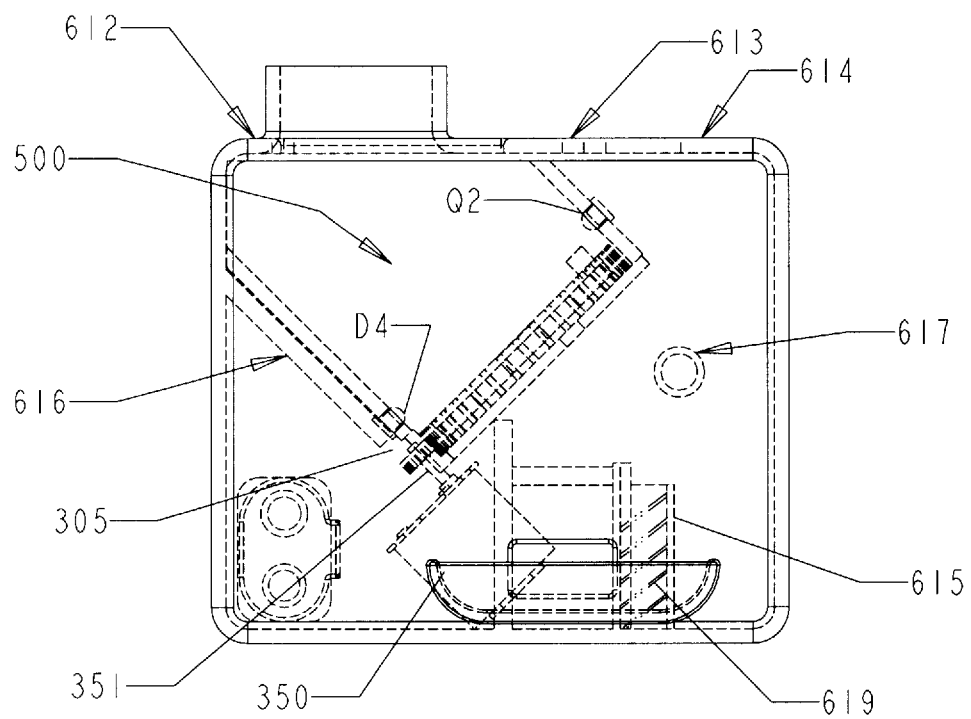
FIG. 7 is an isometric view of a version of the motorized tablet dispenser of the invention showing the tablet hopper, motor and tablet sensor assemblies, with most other assemblies removed for clarity.
Figure 7A:
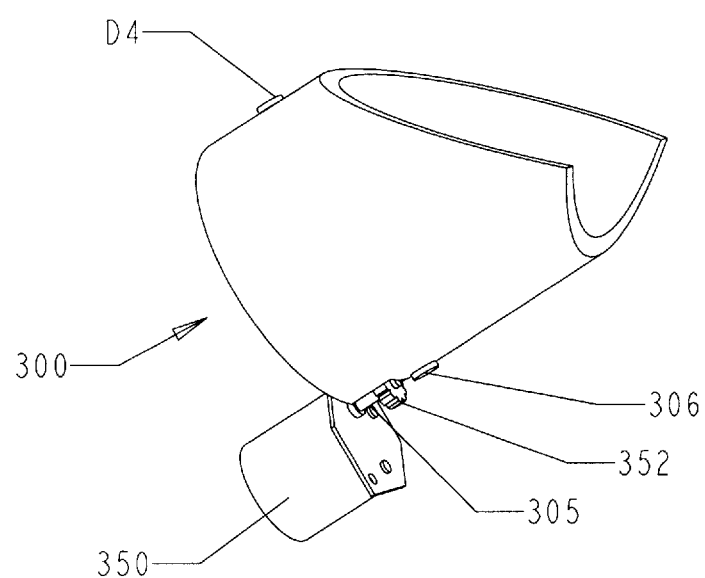
FIG. 7A is a perspective view of the tablet hopper and motor, removed from the tablet dispenser housing to more clearly show their interaction.
Figure 8:
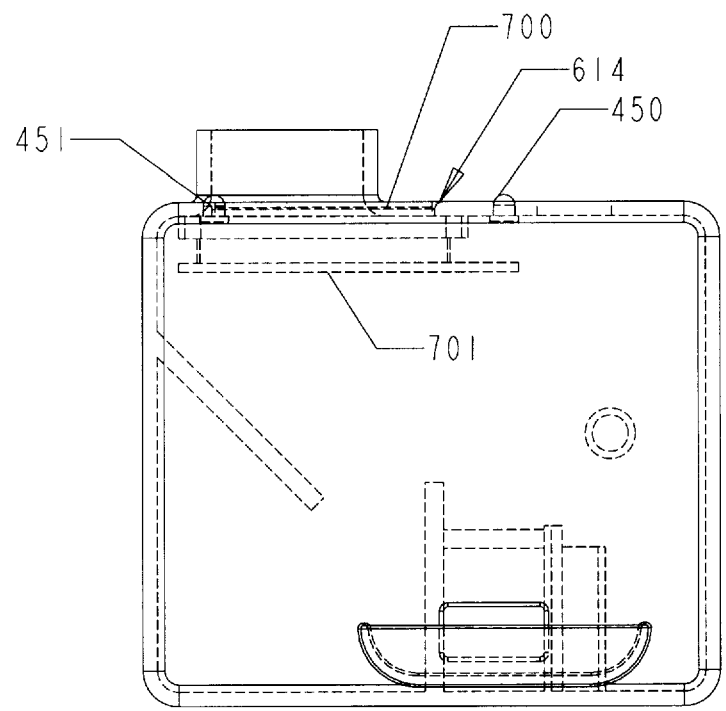
FIG. 8 is an isometric view of a version of the motorized tablet dispenser of the invention showing the LCD and PCB assemblies, with most other assemblies removed for clarity.
Figure 8A:
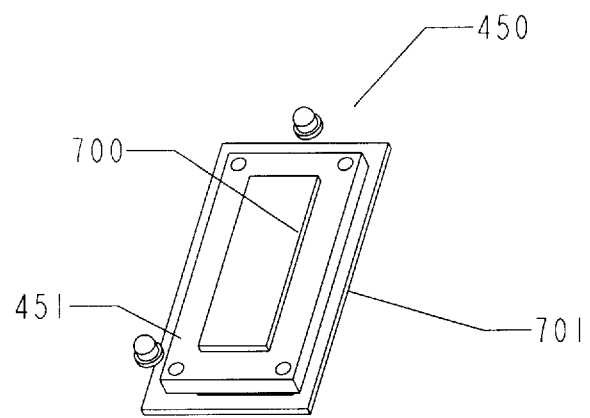
FIG. 8A is a perspective view of the LCD and PCB assemblies, removed from the tablet dispenser housing to more clearly show their features.

Similar front and rear axle supports carry the front and rear axles 153, 154 of the tablet transfer mechanism 150. The rear axle support 617 is seen in FIG. 7, and the front axle support is not shown for reasons of illustrative clarity. In the preferred embodiment, the front and rear axle supports are built into the front and back walls 604, 605 of the housing 600, and provide sockets that carry the ends of the axles 153, 154. Other methods of supporting the a tablet transfer mechanism could be envisioned, including supporting structures rising from the bottom surface 603 of the housing.

A motor support structure 618 is carried by the bottom surface 603, and carries the motor 350 at an angle appropriate to engage the spur gear perimeter 329.

A tablet slide 400 is carried by the bottom surface 603 of the housing 600. The slide transfers the tablet to the receptacle 608 after the tablet falls from the tablet recess 152 of the tablet transfer mechanism 150. The slide provides an inclined surface 401 carried by a support wall 402.

Activation means, such as a pushbutton mechanism 100 or a rotating knob, provides the mechanical energy needed to activate the tablet transfer mechanism and to activate switch 200. The pushbutton mechanism 100 is carried by the housing 600, and travels in the vertical direction. Manual operation of the pushbutton mechanism 100 along a vertical axis results in a rotary motion of the tablet transfer mechanism 150. The upper portion of the pushbutton mechanism is supported by a pushbutton 101 held in place by pushbutton hole 611. The lower portion of the pushbutton mechanism forms a plunger 108 sized to slide within the spring support tube 615. The pushbutton mechanism is movable between an upper position and a lower position. In its upper position, as seen in FIG. 1, the upper shoulder 102 of the cylindrical body 103 is in contact with the top 602 of the housing. In this position, the spring, carried in the spring support tube, is relaxed and elongate. The pushbutton mechanism may be moved to a lower position by manually depressing the pushbutton 101, thereby compressing the spring into its shortened state. In this position, the bottom surface 109 of the plunger 108 is in contact with the bottom 603 of the housing 600. In its lower position, a lower shoulder 107 is in contact with the spring support tube 615. When the user releases the pushbutton 101, the spring will return the pushbutton assembly to its upper position.

The body 105 of the pushbutton assembly provides two planar sides, and extends from the middle shoulder 104 to the lower shoulder 107. A first drive linkage, carried by the body of the pushbutton assembly, engages a second drive linkage carried by the tablet transfer mechanism. In the preferred embodiment, the first drive linkage is a drive slot 106, horizontally oriented in a middle area of the body 105. The drive slot is sized to engage the drive rod 155 of the tablet transfer mechanism 150. The elongate nature of the drive slot 106 allows the drive slot to move in an oscillating vertical direction, while the drive rod 155 moves in an oscillating rotary motion. Note that in an alternative embodiment, the pushbutton mechanism might have the drive rod, and the tablet transfer mechanism might have the drive slot.

Figure 2A:
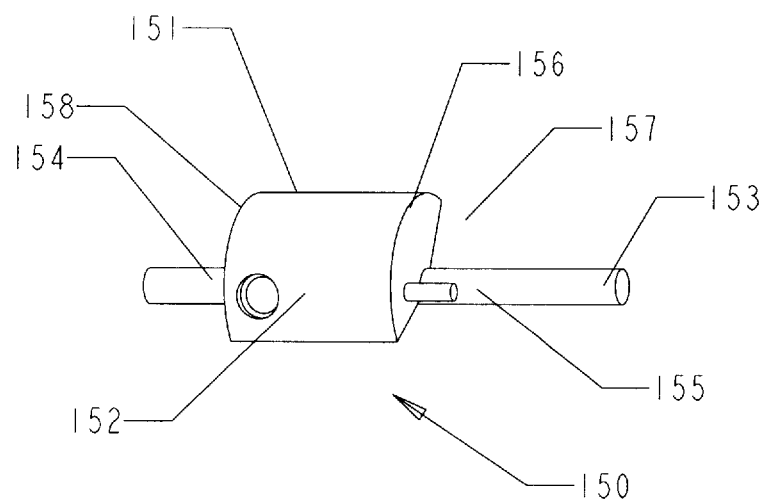
FIG. 2A is a perspective view of the tablet transfer mechanism, removed from the tablet dispenser housing to more clearly show its features.
Figure 3:
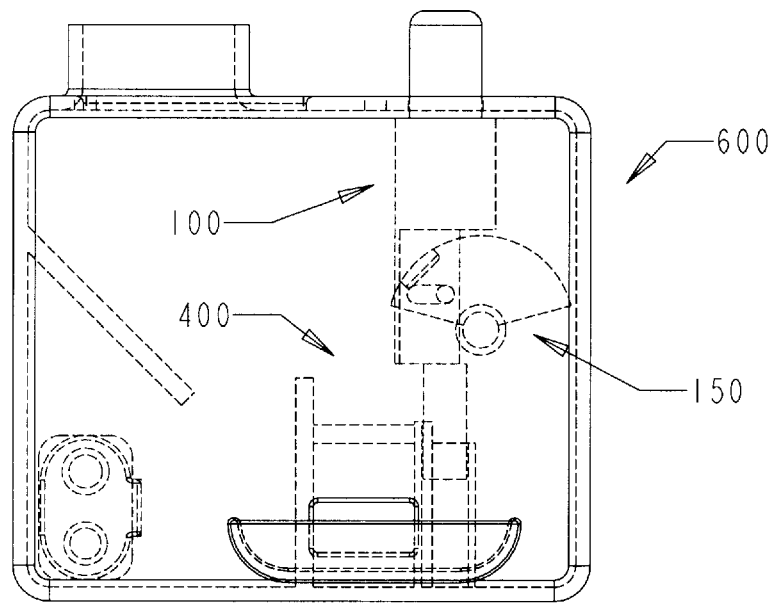
FIG. 3 is an isometric view of a version of the motorized tablet dispenser of the invention showing the interaction between the pushbutton and tablet transfer assemblies, with most other assemblies removed for clarity.
Figure 3A:
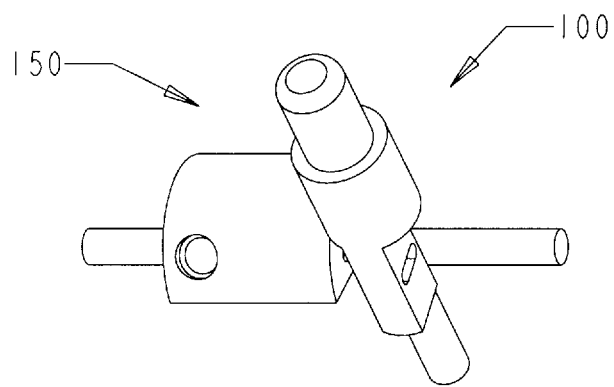
FIG. 3A is a perspective view of the tablet transfer and pushbutton assemblies, removed from the tablet dispenser housing to more clearly show their interaction.
Figure 4:
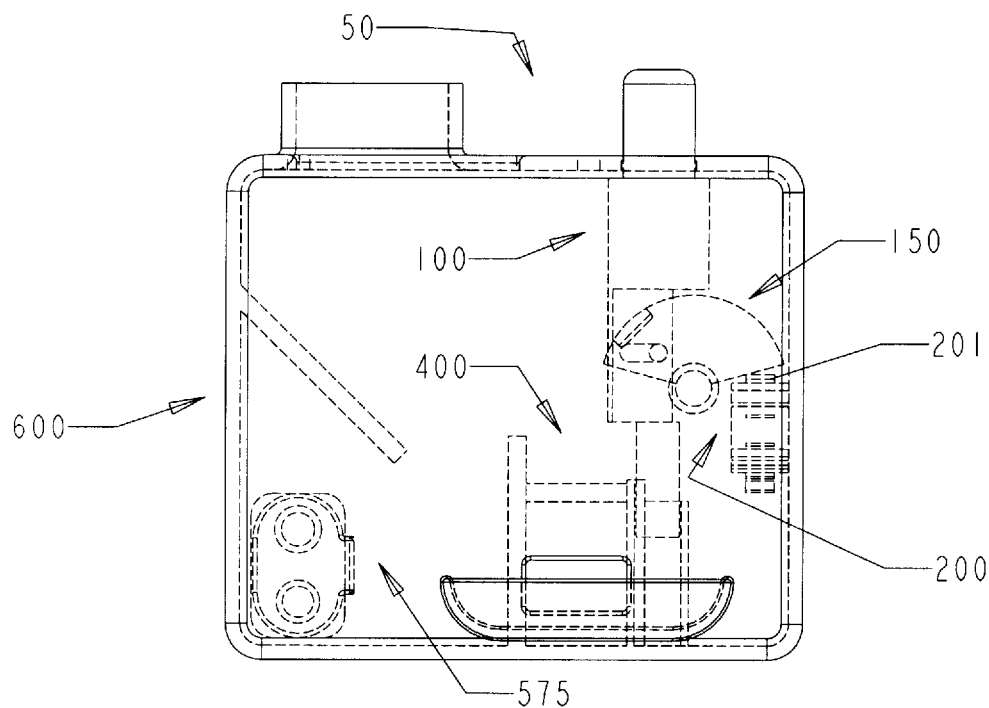
FIG. 4 is an isometric view of a version of the motorized tablet dispenser of the invention showing the tablet transfer, pushbutton and switching assemblies, with most other assemblies removed for clarity.
Figure 4A:
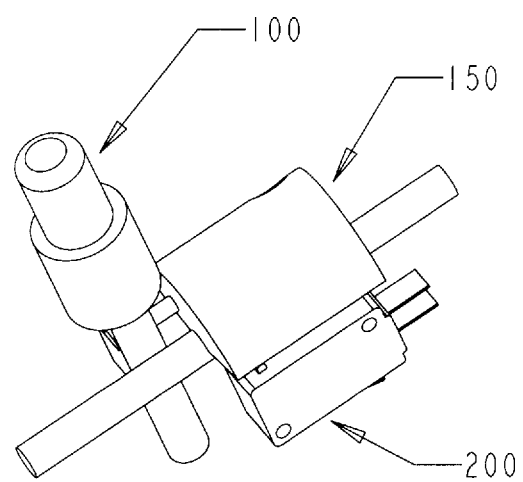
FIG. 4A is a perspective view of the tablet transfer, pushbutton and switching assemblies, removed from the tablet dispenser housing to more clearly show their interaction.

Tablet transfer means 150, carried adjacent to the loading plate means, transfers a first tablet from the loading plate to a receptacle carried by the motorized tablet dispenser. In the preferred version of the invention, the tablet transfer mechanism 150 transfers individual tablets from the tablet drop hole 304 of the barrel 301 to the tablet slide 400. Referring in particular to FIGS. 2 and 2A, the tablet transfer mechanism provides a body 151 having a tablet recess 152. Co-linear front and rear axles 153, 154 extend from the body in opposite directions. A second drive linkage engages the first drive linkage of the push button mechanism. The second drive linkage in the preferred embodiment is a drive rod 155, but could alternatively be a drive slot. The drive rod is approximately 0.5 inches in length, and engages the drive slot 106 of the pushbutton mechanism. The drive rod is parallel to the front axle 153 and is offset from that axle by approximately 0.5 inches. As seen in FIG. 9, a cylindrical surface 156 contacts the bottom 303 and tablet drop hole 304 of the hopper mechanism 300. When the tablet recess 152 is adjacent to the tablet drop hole, a tablet transfers into the tablet recess 152. When other portions of the cylindrical surface 156 are in contact with the tablet drop hole, tablets are prevented from exiting the barrel 301.

The cylindrical shape of the surface 156 tends to prevent tablets from jamming, and allows only one tablet to exit the disk-like loading plate.

The body of the tablet transfer mechanism also provides planar front and rear end surfaces 157, 158, as well as planar lower left and right surfaces 159, 160.

Figure 5:
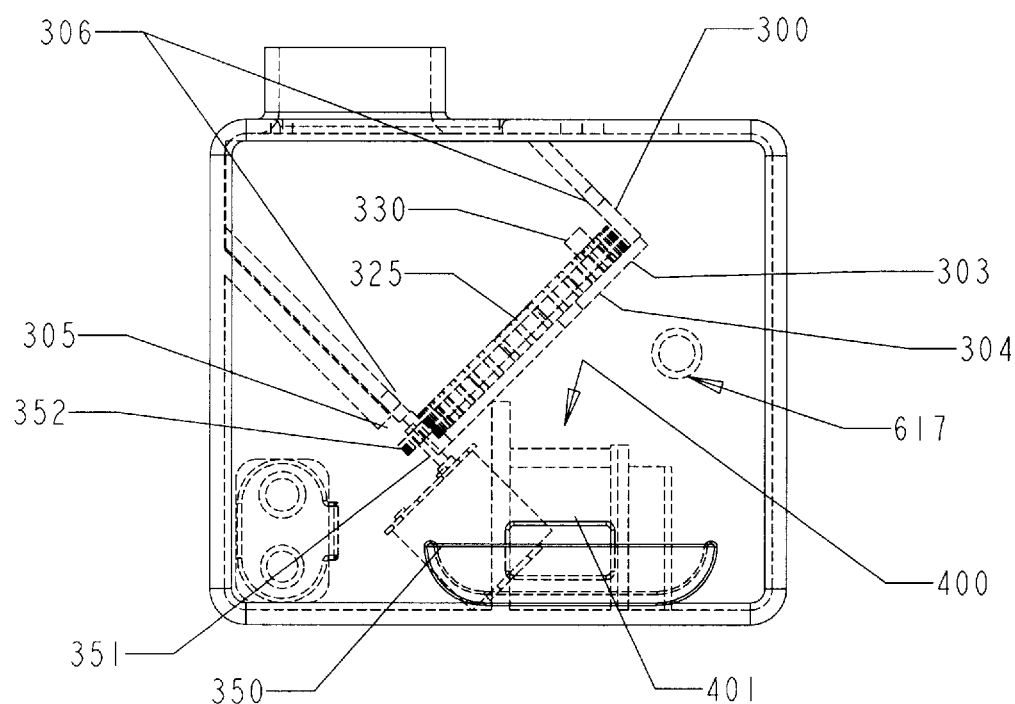
FIG. 5 is an isometric view of a version of the motorized tablet dispenser of the invention showing the tablet hopper and motor assemblies, with most other assemblies removed for clarity.
Figure 5A:
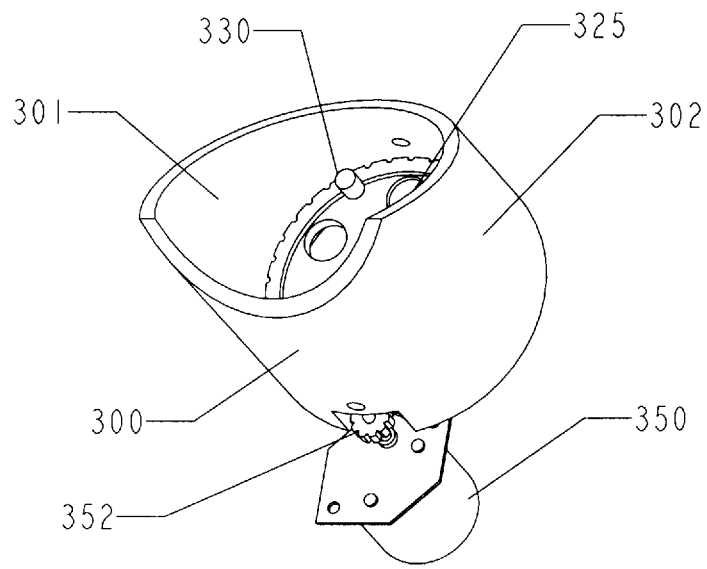
FIG. 5A is a perspective view of the tablet hopper and motor assemblies, removed from the tablet dispenser housing to more clearly show their interaction.
Figure 6:
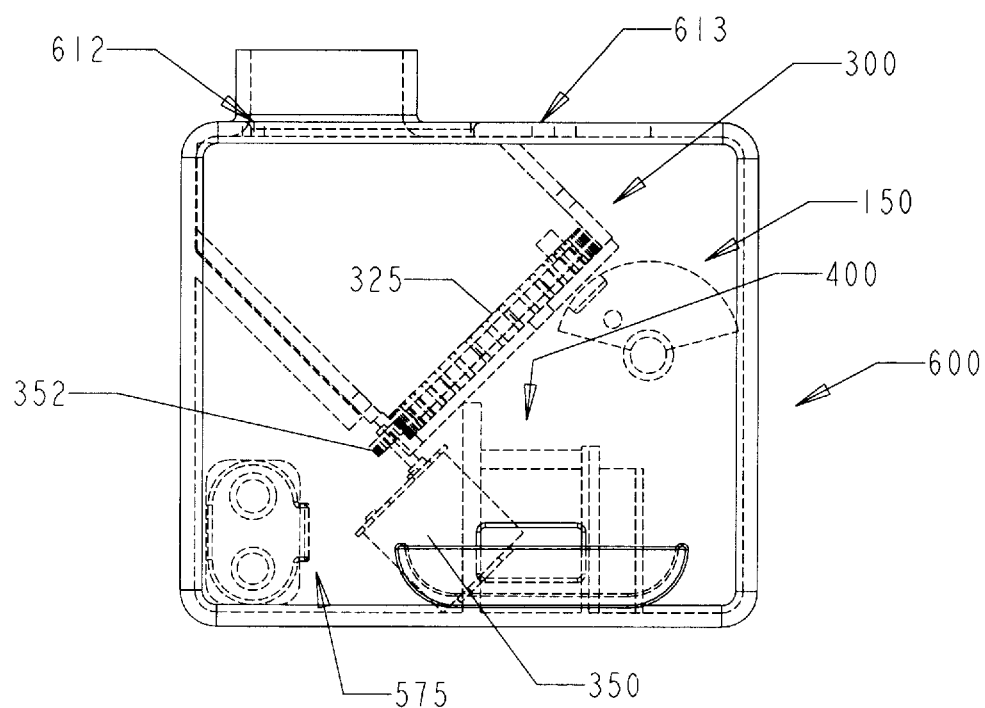
FIG. 6 is an isometric view of a version of the motorized tablet dispenser of the invention showing the tablet hopper, motor and tablet transfer assemblies, with most other assemblies removed for clarity.
Figure 6A:
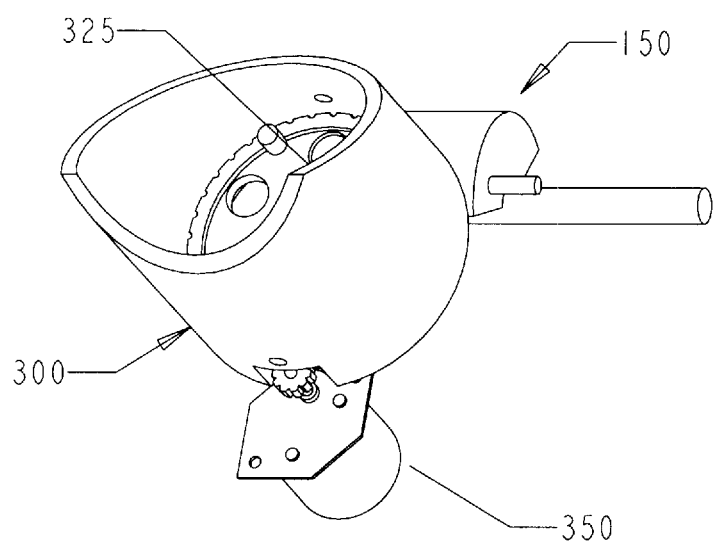
FIG. 6A is a perspective view of the tablet hopper, motor and tablet transfer assemblies, removed from the tablet dispenser housing to more clearly show their interaction.

A tablet hopper mechanism 300 is suitably sized to carry a full prescription, which may include a hundred or more tablets. As seen in FIGS. 5 and 5A, a barrel 301, having cylindrical sides 302 and a planar bottom surface 303, actually carries the tablets. A tablet drop hole 304, in the bottom surface 303, allows tablets to be removed from the barrel, as will be seen. The planar bottom surface is typically at slight angle to the horizontal, as seen in the drawings. An output gear hole 305, best seen in FIG. 5A, allows the output gear 352 of the motor 350 to contact the loading plate 325.

Diametrically opposed sensor holes 306 allow the IR-emitting LED D4 and associated photo transistor Q2 of the sensor device 500 to be mounted as seen in FIG. 7.

A circular, disk-like loading plate 325 is carried by the bottom 303 of the barrel 301, and is rotated by the motor 350. The loading plate 325 provides parallel planar top and bottom surfaces 326, 328 and a spur gear perimeter 329. The spur gear perimeter is sized to mesh with the output gear 352 of the electric motor. A stirring post 330 is best seen in the views of FIG. 12. The stirring post functions by causing somewhat random movements of the tablets stored in the barrel 301. Such movements cause tablets to become lodged in radially arrayed tablet voids 327.

Referring to the 16 views seen in FIG. 12, it can be seen that tablet voids 327 may be made in any appropriate size or shape. The views seen in FIG. 12 represent the loading plates designed to accommodate the physical sizes of sixteen of the currently most-prescribed drugs. Other loading plates having differently configured or sized tablet voids could easily be created, to accommodate tablets of different sizes.

Motor means drive the loading plate in a rotary manner. While typically comprising an electric motor, the motor means may include any wind-up or spring type device, of the type found in toys or clocks or similar equipment.

In the preferred embodiment of the invention, seen in FIG. 5, the motor means employs the high torque, low speed electric motor 350 having a drive shaft 351 and an output gear 352. The output gear is sized to mesh with the spur gear perimeter 329 of the loading plate. In the preferred embodiment, the motor is powered by a 9V direct current battery. Alternatively, the motor could be powered by alternating current or direct current from a power supply. The motor is carried by a support structure 618, which is part of the housing 600, at an angle of approximately 45 degrees, as seen in FIG. 10.

An electrical switch 200 controls the operation of the motor 350. The electrical switch is activated by contact with the tablet transfer mechanism 150, as a result of a user's manual movement of the pushbutton mechanism. Alternately, the electrical switch could be activated by contact with the pushbutton. As seen in FIG. 9, the lower right surface 160 releases the button 201 of the switch 200 when the tablet transfer mechanism 150 is rotated in the counter-clockwise direction. Release of the pushbutton mechanism activates the motor, which operates a preset period of time.

In the preferred embodiment, a battery assembly 575 provides a standard 9V battery 576 having a standard snap-on/snap-off harness 577. The battery supplies power to the motor, LEDs, LCD display, printed circuit card and other components, as needed. The battery is suitable for easy replacement, if needed, although in the preferred embodiment a single 9V battery will last for a minimum of several months.

Figure 13:
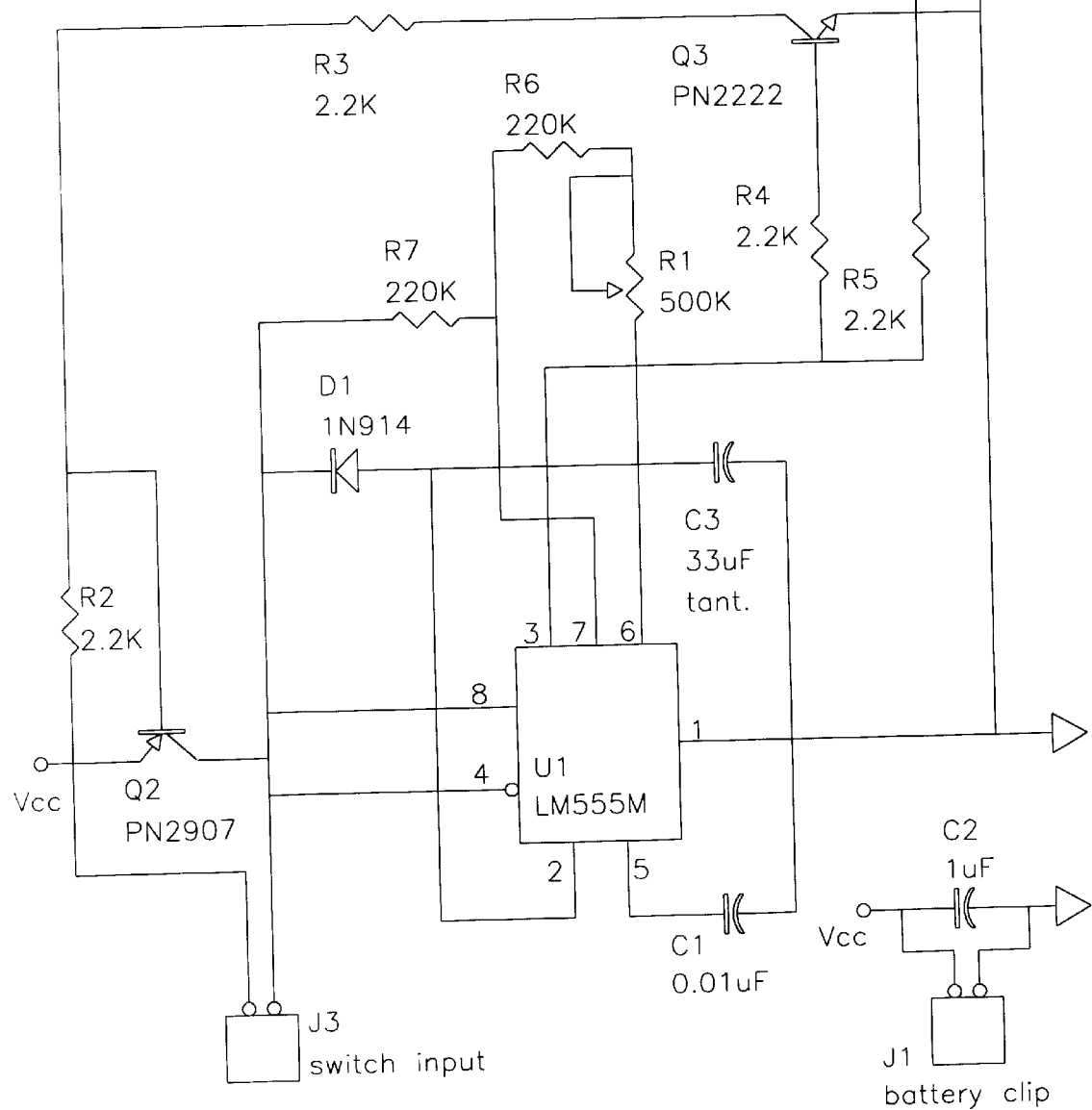
FIG. 13 is an electrical schematic showing a first version of the electronic portion of the invention.

The motorized tablet dispenser of the invention provides, and is compatible with, a number of different versions of electronic control circuits. Four representative electronic control circuits are disclosed. Referring to FIG. 13, a first example of an electronic control circuit suitable for use with the invention is seen. In the first example, the electronic control circuit functions to regulate the length of the period of time during which power is applied to the electric motor driving the loading plate following a release of switch 200.

As seen in FIG. 13, motor timer means, in this version of the invention comprising an LM555M timer, are used to time the period of the operation of the motor 350. The period of time is started by release of the switch 200 having a button 201, as seen in FIG. 9. Release of switch 200, which is attached to the printed circuit board at connector J3, results in power being applied to electric motor 350, which is attached to connector J2. The period of time that power is applied to motor 350 is somewhat arbitrary, but is typically approximately 10 seconds. This period of time is typically sufficient for one complete revolution of the loading plate. The period must be long enough for the stirring post 330 of the loading plate 325 to stir the tablets, thereby causing tablets to fill any tablet voids 327 that are not already filled.

Referring to FIG. 13, the LM555M timer is associated with resistors and capacitors that determine the actual delay. Selection of these components is somewhat arbitrary, since the period of time that the motor is required to operate is somewhat flexible. The 555 timer is operated in monostable mode, causing the output on pin 3 to signal the end of the timed period, thereby turning off transistor Q1 and power to motor attached to connector J2. In monostable mode, the time of delay is a function of the size of resistors R1, R6 and R7, and the size of capacitor C3. Increasing the value of any of these component increases the time period.

Figure 14:
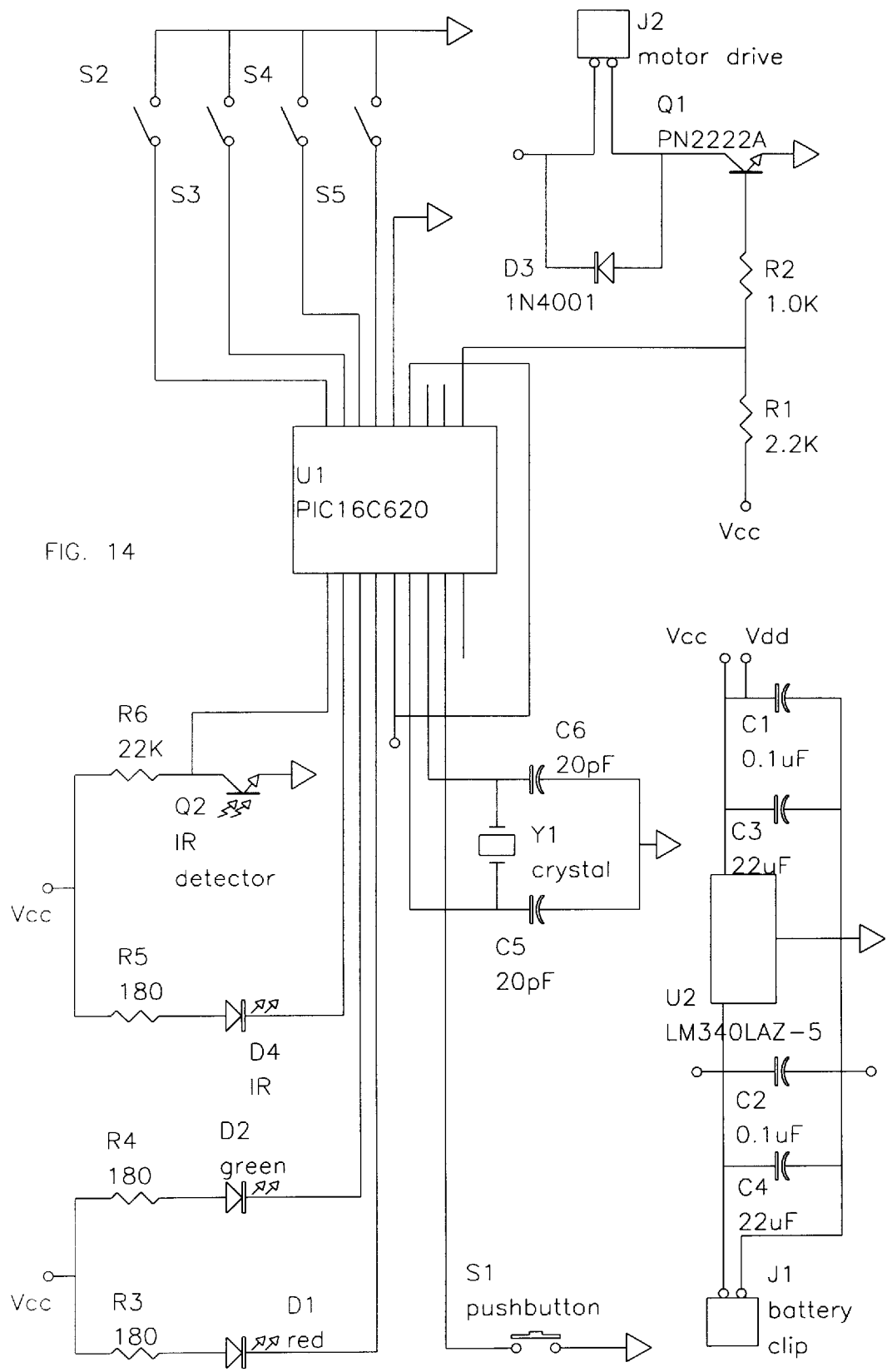
FIG. 14 is an electrical schematic showing a second version of the electronic portion of the invention.

Referring to FIG. 14, a second example of an electronic control circuit suitable for use with the invention is seen. The second example circuit provides the same functionality of the first example circuit, i.e. motor timer means for timing the period during which power is applied to the electric motor driving the loading plate following release of switch 200, but provides four additional functions. First, tablet frequency means for inputting the frequency of desired tablet consumption is provided, corresponding with a prescription intake rate of once-a-day, twice-a-day, or other rate. Second, the circuit provides a green LED which is lit when it is time for the patient to take a tablet. Third, a sensor is provided which detects when the tablet hopper is nearly empty. And fourth, the circuit provides a red LED which is lit when it is time to refill the tablet hopper.

While a variety of microcontrollers could be adapted for use, in the example shown in FIG. 14 the microcontroller U1 is a PICI6C20. Within this document, the term microcontroller will be applied to all microcontroller, microprocessor or similar devices having instruction-executing and input/output capabilities.

A crystal Y1 may be necessary for inputting a clock signal into a microcontroller not having an internal clock. A voltage regulator U2 may be required to regulate, and typically reduce, the voltage, where the source of power is a 9 volt battery, connected by a battery clip J1.

Tablet frequency means such as switches S2, S3, S4 and S5 are used to input information to the microcontroller on the frequency per day that a tablet must be consumed. In a typical application, these switches could be simple jumpers, although a dip switch or other switching device would be usable. In this example, S2 is associated with the one-per-day rate, S3 is associated with the two-per-day rate, S4 is associated with the three-per-day rate and S5 is associated with the four-per-day rate. Alternately, it is clear that two switches, when used as binary inputs, may represent four distinct tablet frequencies. Similarly, one switch may represent two distinct tablet frequencies.

Prescription timer means for calculating the period of time until the patient should take a tablet is provided by the microcontroller U1. The microcontroller, having input from the clock IC Y1, and known software for executing simple delays, times the appropriate period after a tablet is released before indicating that another tablet should be taken.

Indicator means, are provided to indicate that it is time for the patient to take a tablet. In a preferred version of the invention, the indicator means comprises a green LED 450. In an alternate version of the invention, the indicator means comprises an acoustical beeper. In a still further alternate version of the invention, the indicator means comprises an annunciator using a voice recording to verbally announce to the user that it is time to take a tablet. Such voice recording devices are well-known, and used in a variety of toys, greeting cards, automobiles and other electronic devices. Two or more of the above, or equivalent, annunciators could be combined, as desired.

An indicator means, such as a green LED 450, is tied to high voltage and to the microcontroller. By dropping the voltage on the output tied to the green LED, the microcontroller may turn the LED on, indicating that it is time to take a tablet. Similarly, by raising the voltage level on the output, the microcontroller may turn off the green LED.

Figure 15:
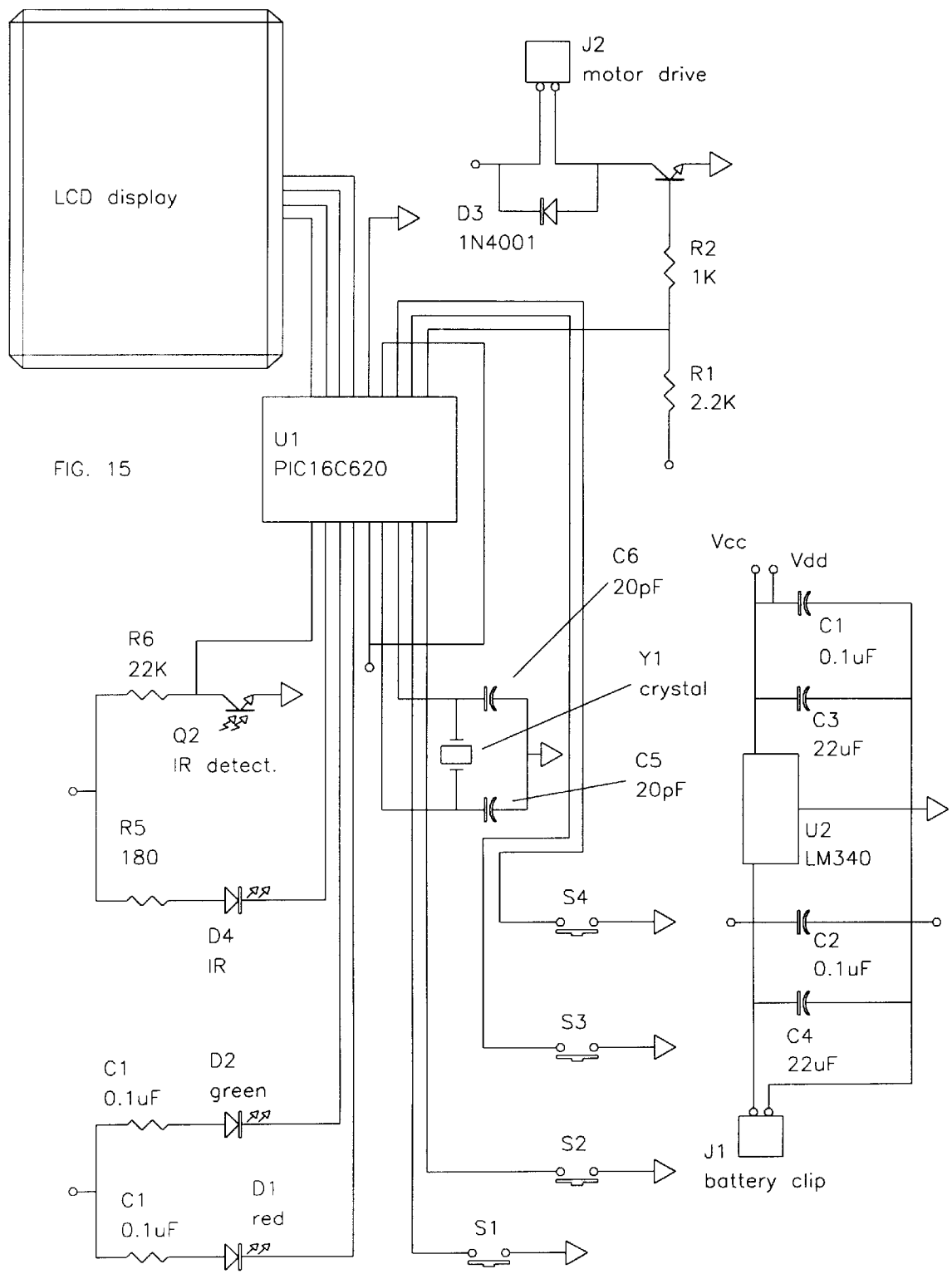
FIG. 15 is an electrical schematic showing a third version of the electronic portion of the invention.

Tablet sensor means produces an output signal in response to the quantity of tablets in remaining in the hopper. In a typical embodiment of the invention, the sensor will provide a first signal indicating that sufficient tablets remain; a second signal indicates that there is a need to refill. As seen in FIGS. 14 and 15, a typical embodiment of the tablet sensor means 500 provides an IR-emitting LED D4 and a photo-sensitive NPN transistor Q2. The components are mounted on diametrically opposed locations on the tablet hopper 300 in support holes 306. Depending on the state of the transistor Q2, an input line to microcontroller U1 will be pulled to either a high or low voltage potential. When the number of tablets remaining in the hopper is sufficiently small, the light emitted from the diode D4 will make contact with the transistor Q2. Light hitting the transistor Q2 will cause the transistor to change state, causing a signal to be transmitted to the microcontroller U1. When the hopper is again filled with tablets, the optical connection between diode D4 and transistor Q2 will be broken by tablets which prevent light from reaching the transistor. The appropriate signal will then be sent to microcontroller U1.

A second indicator means is provided to indicate that the tablet hopper is almost empty. In a preferred version of the invention, the second indicator means comprises a red LED 451. In an alternate version of the invention, the indicator means comprises an acoustical beeper. In a still further alternate version of the invention, the indicator means comprises an annunciator using a voice recording to verbally announce to the user that it is time to refill the hopper with tablets. Two or more of the above, or equivalent, annunciators could be combined, as desired.

A second indicator means, such as red LED 451, is tied to high voltage and to the microcontroller. By dropping the voltage on the output tied to the red LED, the microcontroller may turn the LED on, indicating that it is time to refill the tablet hopper. Similarly, by raising the voltage level on the output, the microcontroller may turn off the red LED.

Timer means for controlling the period of time that power is applied to the motor after release of the switch S1, which is associated with switch housing 200, is provided. The microcontroller U1, having input from a clock Y1 and having known delay creating software, may be used to control the period of time that the motor 350 operates. An input line connects switch S1 to microcontroller U1. An output line from the microcontroller controls a switching transistor Q1, which controls operation of the motor, which is attached to connector J2. Internal programming in the microcontroller turns on the motor in response to activation of switch S1. At this point, the microcontroller simply delays a programmed period of time, typically about 10 seconds, and then turns off the motor. The period of time is typically that which is required to complete one complete rotation of the loading plate 325.

Either the above two examples of electronic control circuits may be complemented by the addition of a stand-alone liquid crystal display (LCD) 700 having a variety of functional characteristics. Such an LCD are well-known and commercially available. An LCD, having its own controller electronics 701, could provide time of day, day of week and user or manufacturer programmable alarm functionality.

A fourth example of an electronic control circuit is seen in FIG. 15. The fourth example circuit provides all of the functionality of the previously described electronic control circuits. However, the circuit seen in FIG. 15 monolithic and integrated, in that the microcontroller controls the LCD display, which is not a stand-alone unit. Such LCD displays, controllable by microcontroller or microprocessor devices, are well-known and commercially available.

Continuing to refer to FIG. 15, it can be seen that attachment of the LCD display to the microcontroller allows information to be transferred in both directions. For example, the microcontroller may transmit to the LCD for display such information as the time of day, day of week, and month, date, and year. The microcontroller may be programmed to display messages of a textual nature, such as "TAKE NEXT TABLET AT 3PM". The microcontroller may also signal the patient to take a pill by operation of a beeper carried by the LCD display. Such beepers are often integrated into commercially available LCD displays.

Additionally, the LCD display may have a rudimentary keypad, including one or more buttons, thereby allowing a user to set an alarm, reset the time and date, or provide other functions. Input from the keypad would directly transfer information to the microcontroller. Four data lines are shown connecting the LCD to the microcontroller. These lines would support serial communication using known protocols.

Optionally, in any version of the invention having a microcontroller, an input line to the microcontroller may be attached to a sensor capable of detecting the presence of a patient within the room containing the motorized tablet dispenser. Such sensors are well known, and are used in such applications as in washrooms to operate the plumbing. Such sensors employ various technologies. Some sense changing patterns of light and dark, sometimes using a light beam that may be blocked by a patient's movement within the room. Others use infrared technology, in a manner similar to that used in auto focus cameras. Input from the sensor could be programmed to trigger the operation of any of the above described acoustic annunciators, including a verbal announcement, in the event that the time elapsed since the last tablet was sufficient to indicate that a further tablet should be taken. The acoustic annunciator could be activated by the programming resident in the microcontroller either at the time the patient was detected, or if desired, at the time the patient was no longer detected. In the latter case, it would be presumed that the patient had just left the room, typically the bathroom, and had failed to notice the green LED. The acoustic alarm would cause the patient to return to take the tablet.

To use the motorized tablet dispenser of the invention, the patient pushes down on the pushbutton 101, causing the drive slot 106 to go down, thereby causing the drive rod 155 of the tablet transfer mechanism to rotate, thereby causing the tablet contained in the tablet recess 152 to drop onto the slide 400 from which the tablet falls to the receptacle 608, where it may be picked up by the patient.

Rotation of the tablet transfer mechanism releases switch S1, causing the motor to drive the loading plate for a timed period. In a first version of the invention, a 555 timer turns off the motor after approximately 10 seconds. In other versions of the invention, a microcontroller turns the motor off.

In some versions of the invention, release of switch S1 also causes the microcontroller to execute prescription timer means for timing the period until the next tablet should be taken. At the end of the timed period, an annunciator would prompt the patient to take another tablet.

After a sufficient number of tablets have been taken, sensor means for determining the quantity of tablets in the hopper would send the microcontroller a signal indicating that the hopper needed refilling. In response, the microcontroller would activate an annunciator which would alert the patient, who could then order a refill of the prescription.

The previously described versions of the present invention have many advantages, including a primary advantage of providing a novel motorized tablet dispenser that is reliable, suited to almost any tablet type, having a jam-proof design and low cost of manufacture.

Another advantage of the present invention is to provide a novel motorized tablet dispenser with the advantage of pushbutton activation means suited for use by patients who are unable to turn a knob. Alternatively, the invention is also adaptable to activation by means of a knob, if that is desired.

Another advantage of the present invention is to provide a novel motorized tablet dispenser having an electronic sensing means for determining when the tablet hopper is nearly empty, and LED warning means for alerting the patient of this event.

Another advantage of the present invention is to provide a novel motorized tablet dispenser that is suitable for use with a plurality of loading plates, each loading plate custom designed for use with a specific tablet size, shape and type.

Another advantage of the present invention is to provide a novel motorized tablet dispenser that will run for months on a single 9V battery, or indefinitely if plugged into 110 volt ac current.

Another advantage of the present invention is to provide a novel motorized tablet dispenser having an annunciator to indicate to the patient that it is time to take a tablet.

Although the present invention has been described in considerable detail and with reference to certain preferred versions, other versions are possible. For example, while the preferred version of the invention provides a 9 volt battery as a power source, other versions of the invention could use 110 volt ac power from a wall outlet. Similarly, while the preferred version of the invention provides a pushbutton structure to activate the tablet dispensing mechanism, an alternate version of the invention could use a knob to activate the dispensing mechanism. And, while four versions of electronics compatible with, and forming a part of, the invention have been disclosed, it is clear that equivalent electrical means could be designed for providing the same functionality. Similarly, where two components may be mechanically linked by drive linkages, it is clear that the drive rod and drive slot could be reversed or replaced with functionally similar drive linkages. And lastly, where certain preferred annunciators have been disclosed, it is clear that there are a number of annunciators could be substituted for the annunciators disclosed, while still keeping with the teachings of the invention. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A motorized tablet dispenser, comprising:
   (a) tablet hopper means for carrying a supply of tablets;
   (b) loading plate means, carried adjacent to the tablet hopper means, for separating a first tablet from the supply of tablets;
   (c) motor means, having an output gear in contact with the loading plate means, for rotating the loading plate means;
   (d) switching means, in electrical communication with the motor means, for activating the motor means;
   (e) tablet transfer means, carried adjacent to the loading plate means, for transferring the first tablet from the loading plate means to a receptacle carried by the motorized tablet dispenser;
   (f) activation means, mechanically linked to the tablet transfer means, for driving the tablet transfer means and for activating the switching means; and
   (g) motor timer means, in electrical communication with the motor means and the switching means, for turning the motor off after a timed period.

2. The motorized tablet dispenser of claim 1, wherein
   (a) the activation means additionally comprises:
      (a) a pushbutton; and
      (b) a body portion having a drive slot, the body portion attached to the pushbutton; and
   (b) the tablet transfer means additionally comprises a drive rod engaging the drive slot of the activation means.

3. The motorized tablet dispenser of claim 1, further comprising:
   (a) prescription timer means, electrically connected to the switching means, for timing the period until a patient should take a tablet; and
   (b) first indicator means, electrically connected to the prescription timer means, for indicating that the patient should take a tablet.

4. The motorized tablet dispenser of claim 3, further comprising tablet frequency means, electrically attached to the prescription timer means, for defining the length of the time period that the prescription timer means times.

5. The motorized tablet dispenser of claim 4, wherein the tablet frequency means, comprises at least one switch in electrical communication with the prescription timer means.

6. The motorized tablet dispenser of claim 1, wherein the motor timer means comprises a microcontroller device.

7. The motorized tablet dispenser of claim 1, wherein the motor timer means comprises a 555 timer.

8. The motorized tablet dispenser of claim 6, further comprising:
   (a) sensor means, in electrical communication with the microcontroller device, for producing a sensor output signal in response to the quantity of tablets in the tablet hopper; and
   (b) second indicator means, electrically connected to the microcontroller device, for indicating that the patient should refill the tablet hopper.

9. The motorized tablet dispenser of claim 1, further comprising:
   (a) stand-alone display means, carried by the motorized tablet dispenser, for displaying the time of day.

10. A motorized tablet dispenser, comprising:
   (a) a housing, having a pushbutton hole, additionally comprising:
      (a) a body;
      (b) a fill port, carried by the body;
      (c) receptacle means, carried by the body, for tablet delivery; and
      (d) a spring support tube, carried by the body, the spring support tube carrying a spring;
   (b) pushbutton mechanism, comprising:
      (a) a pushbutton, carried by the pushbutton hole;
      (b) a body having a drive slot, the body attached to the pushbutton; and
      (c) a plunger, attached to the body, the plunger carried by the spring support tube of the housing;
   (c) a tablet hopper having a tablet drop hole, carried by the housing, comprising:
      (a) barrel means for storage of a supply of tablets; and
      (b) loading plate means for separating a single tablet from a plurality of tablets, carried adjacent to the barrel means, the loading plate means having a top surface having a plurality of radially distributed tablet voids, the loading plate means further comprising:
         (a) a spur gear perimeter adjacent to the top surface; and
         (b) a stirring post carried by the top surface;
   (d) an electric motor having an output gear driving the spur gear perimeter of the loading plate means;
   (e) a tablet transfer mechanism, comprising:
      (a) a wedge shaped body, pivotally carried by the housing;
      (b) the wedge shaped body having a cylindrical surface having a tablet recess movable against the loading plate means; and
      (c) a drive rod, carried by the wedge shaped body, engageable with the drive slot of the pushbutton mechanism;
   (f) electrical switching means, activated in response to movement of the pushbutton, for turning on the electric motor; and
   (g) timer means, activated by the electrical switching means, for turning off the motor.

11. A motorized tablet dispenser, comprising:
   (a) a housing, having a pushbutton hole, additionally comprising:
      (a) a body;
      (b) a fill port, carried by the body;
      (c) receptacle means, carried by the body, for tablet delivery; and
      (d) a spring support tube, carried by the body, the spring support tube carrying a spring;
   (b) pushbutton mechanism, comprising:
      (a) a pushbutton, carried by the pushbutton hole;
      (b) a body having a drive slot, the body attached to the pushbutton; and
      (c) a plunger, attached to the body, the plunger carried by the spring support tube of the housing;

(c) a tablet hopper having a tablet drop hole, carried by the housing, comprising:
  (a) barrel means for storage of a supply of tablets; and
  (b) loading plate means for separating a single tablet from a plurality of tablets, carried adjacent to the barrel means, the loading plate means having a top surface having a plurality of radially distributed tablet voids, the loading plate means further comprising:
    (a) a spur gear perimeter adjacent to the top surface; and
    (b) a stirring post carried by the top surface;
(d) an electric motor having an output gear driving the spur gear perimeter of the loading plate means;
(e) a tablet transfer mechanism, comprising:
  (a) a wedge shaped body, pivotally carried by the housing;
  (b) the wedge shaped body having a cylindrical surface having a tablet recess movable against the loading plate means; and
  (c) a drive rod, carried by the wedge shaped body, engageable with the drive slot of the pushbutton mechanism;
(f) electrical switching means, activated in response to movement of the pushbutton, for turning on the electric motor;
(g) timer means, activated by the electrical switching means, for turning off the motor;
(h) prescription timer means, electrically connected to the switching means, for timing the period until a patient should take a tablet;
(i) first indicator means, electrically connected to the prescription timer means, for indicating that the patient should take a tablet; and
(j) tablet frequency means, electrically attached to the prescription timer means, for defining the length of the time period that the prescription timer means times.

12. The motorized tablet dispenser of claim 11, wherein the timer means comprises a microcontroller device, the motorized tablet dispenser further comprising:
  (a) sensor means, in electrical communication with the microcontroller device, for producing a sensor output signal in response to the quantity of tablets in the tablet hopper; and
  (b) second indicator means, electrically connected to the microcontroller device, for indicating that the patient should refill the tablet hopper.

* * * * *